US006978629B2

United States Patent
Yoshida et al.

(10) Patent No.: US 6,978,629 B2
(45) Date of Patent: Dec. 27, 2005

(54) VEHICLE AIR CONDITIONER

(75) Inventors: Makoto Yoshida, Hiroshima (JP); Mitsuyo Oomura, Hekinan (JP); Toshinobu Homan, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/926,560

(22) Filed: Aug. 26, 2004

(65) Prior Publication Data

US 2005/0045322 A1    Mar. 3, 2005

(30) Foreign Application Priority Data

Aug. 27, 2003    (JP)    ............................ 2003-302937

(51) Int. Cl.[7] ........................ P25D 21/00; F25B 49/00; F25D 17/04

(52) U.S. Cl. ........................ 62/150; 62/156; 62/176.6; 62/229; 62/244; 236/44 C

(58) Field of Search ................................ 62/150, 176.6, 62/229, 178, 180, 173, 151, 156, 244; 236/44 C

(56) References Cited

U.S. PATENT DOCUMENTS 6,430,951 B1 *    8/2002    Iritani et al. .................. 62/229
2004/0083748 A1 *    5/2004    Homan et al. ................ 62/244

FOREIGN PATENT DOCUMENTS

JP    7-179120    7/1995

* cited by examiner

*Primary Examiner*—Marc Norman
(74) *Attorney, Agent, or Firm*—Harness, Dickey & Pierce, PLC

(57) ABSTRACT

In a vehicle air conditioner, a controller calculates a first target post-evaporator temperature for defogging a windshield based on a detection humidity of a humidity sensor, and calculates a second target post-evaporator temperature for defogging the windshield regardless of the detection humidity of the humidity sensor. Then, the controller determines a smaller one between the first and second target post-evaporator temperatures, as a target post-evaporator temperature. Accordingly, even when the humidity sensor detects a humidity lower than an actual humidity of a passenger compartment when a blower operates by a low air-blowing amount, a windshield is prevented from fogging.

11 Claims, 12 Drawing Sheets

VEHICLE AIR CONDITIONER

CROSS-REFERENCE TO RELATED APPLICATION

This application is related to and claims priority from Japanese Patent Application No. 2003-302937 filed on Aug. 27, 2003, the content of which is hereby incorporated by reference.

BACKGROUND OF THE INVENTION

1. Field of the Invention

The present invention relates to a vehicle air conditioner which detects a humidity in a passenger compartment and prevents a windshield from being fogged.

2. Description of Related Art

In a conventional vehicle air conditioner described in JP-A-7-179120, an air humidity inside a passenger compartment is detected by a humidity sensor, and defogging operation of a windshield of the vehicle is performed. Specifically, when the windshield of the vehicle satisfies a fogging condition, operation of the compressor is controlled so that a temperature of air after passing through an evaporator disposed in an air conditioning duct becomes a predetermined temperature that is calculated based on the detected humidity of the humidity sensor to defog the windshield.

In this vehicle air conditioner, the humidity sensor is disposed in an air passage through which air flows into the passenger compartment, to detect the humidity of air passing through the air passage. Further, an aspirator is disposed in the air passage, so that a negative pressure is generated in accordance with an air flowing amount in the air passage. Therefore, an air amount corresponding to the air flowing amount in the air passage is ventilated in the passenger compartment.

When a water temperature flowing into a heater core is low at a time immediately after an engine start in a low outside air temperature, a blower for blowing air into the passenger compartment through the air passage is stopped or is operated by a low blowing level (low air amount). However, in this case, air (inside air) in the passenger compartment is not ventilated or is slightly ventilated, and the humidity inside the passenger compartment may be increased. Further, the humidity sensor detects the humidity of air after passing through the evaporator. Therefore, the predetermined temperature for defogging the windshield is calculated based on the detected humidity that is lower than an actual humidity of the passenger compartment. Accordingly, in this case, the windshield may be readily fogged.

SUMMARY OF THE INVENTION

In view of the above problems, it is an object of the present invention to provide an air conditioner for a vehicle, which can accurately prevent a windshield from being fogged even when an air amount introduced into a passenger compartment through an air conditioning duct is small.

It is another object of the present invention to provide an air conditioner for a vehicle, which can accurately prevent the windshield from being fogged while consumption power in a compressor can be reduced.

According to an aspect of the present invention, a vehicle air conditioner includes an air conditioning duct through which air flows into the compartment, a cooling heat exchanger disposed in the air conditioning duct for cooling and dehumidifying air in the air conditioning duct in accordance with operation of the compressor, a temperature detection unit which detects a temperature of air cooled in the cooling heat exchanger, a humidity detection unit which detects a humidity of air passing a ventilation passage through which air inside the compartment is ventilated in accordance with an air flow amount in the air conditioning duct, and a controller which controls the compressor so that the temperature detected by the temperature detection unit approaches a target cooling temperature. In the vehicle air conditioner, when the air flow amount in the air conditioning duct is equal to or larger than a predetermined amount, the controller calculates the target cooling temperature of air to be cooled by the cooling heat exchanger, for defogging a windshield of the vehicle, based on the humidity detected by the humidity detection unit. In contrast, when the air flow amount in the air conditioning duct is lower than the predetermined amount, the controller calculates the target cooling temperature for defogging the windshield based on a set humidity that is higher than the humidity detected by the humidity detection unit. Accordingly, even when an air amount flowing into the compartment (e.g., passenger compartment) through the air conditioning duct is low, it can prevent the windshield from being fogged.

For example, the set humidity is a predetermined constant humidity. Alternatively, the set humidity is higher than the detected humidity of the humidity detection unit by a predetermined value.

Generally, a heating heat exchanger is disposed in the air conditioning duct for heating air after passing the cooling heat exchanger by using a cooling water for cooling a heat-generating member of the vehicle as a heating source, and a blower is disposed in the air conditioning duct for blowing air into the compartment. In this case, the control unit controls an air blowing amount of the blower at a general amount corresponding to one of a temperature of the cooling water flowing into the heating heat exchanger and a relation value relating to the temperature of the cooling water when the one of the temperature of the cooling water and the relation value relating the temperature of the cooling water is in a range between a first value and a second value higher than the first value. Further, the control unit determines a fogging generation condition of the windshield when the one of the temperature of the cooling water and the relation value relating to the temperature of the cooling water is lower than the first value, and the control unit controls the air blowing amount of the blower to be lower than the general amount in the fogging generation condition. Accordingly, even in a case where the temperature of the cooling water or the relation value is lower than the first value in a warming-up control, when the fogging generation condition is determined, air is blown into the passenger compartment by a small amount smaller than the general amount. As a result, even at a time immediately after a start of the warming-up control, the windshield can be effectively defogged.

For example, the control unit determines the fogging generation condition based on at least one of an air temperature inside the compartment and an air temperature outside the compartment.

According to another aspect of the present invention, in a vehicle air conditioner, the controller calculates a first temperature (TEON) for performing a defogging of a windshield of the vehicle based on the humidity detected by the humidity detection unit, and calculates a second temperature (TEOUP1, TEOUP2) for performing the defogging of the windshield regardless of the humidity detected by the humidity detection unit. Further, the controller determines a lower one between the first temperature and the second temperature, as the target cooling temperature (TEO). Accordingly, even when the air blowing amount of the blower into the passenger compartment is smaller, the windshield can be accurately defogged.

Preferably, the controller compares a comparison temperature that is lower by a predetermined temperature than a defogging temperature (TEOTD) of air cooled by the cooling heat exchanger for defogging the windshield, with a frost-preventing temperature of air cooled by the cooling heat exchanger, which is set to prevent a frost of the cooling heat exchanger. Further, the controller determines a higher one between the frost-preventing temperature and the comparison temperature, as the second temperature. In this case, fogging of the windshield can be prevented while it can prevent the cooling heat exchanger from being frosted.

More preferably, a heating heat exchanger is disposed in the air conditioning duct for heating air after passing the cooling heat exchanger by using a cooling water for cooling a heat-generating member as a heating source. In this case, the controller increases the second temperature in accordance with an increase of the temperature of the cooling water or a relation value relating to the temperature of the cooling water. Accordingly, it can accurately prevent the windshield from being fogged while consumption power in the compressor can be effectively reduced.

For example, the controller increases the second temperature such that an increase rate of the second temperature relative to an increase of the temperature of the cooling water or the relation value relating to the temperature of the cooling water is maintained at a set rate or becomes larger. Accordingly, it can prevent the windshield from being fogged while consumption power in the compressor can be more effectively reduced.

More preferably, when the comparison temperature is lower than the frost-preventing temperature, the controller maintains the second temperature at the frost-preventing temperature for a predetermined time, and thereafter increases the second temperature in accordance with the increase of the temperature of the cooling water or the relation value. Therefore, the windshield can be prevented from being fogged while it can prevent the cooling heat exchanger from being frosted.

In the present invention, the humidity detection unit is not limited to be disposed in the ventilation passage. Only when the humidity detection unit is disposed to detect an air humidity relating to the humidity of the passenger compartment, the present invention can be effectively applied.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

A vehicle air conditioner includes an air conditioning unit 6 for performing air-conditioning in a passenger compartment of the vehicle and an air conditioning controller 7 for controlling components (e.g., actuator) of the air conditioning unit 6. In the first embodiment, the air conditioner is an automatic-controlled air conditioner where temperature and humidity in the passenger compartment can be automatically controlled at set values.

Figure 1:
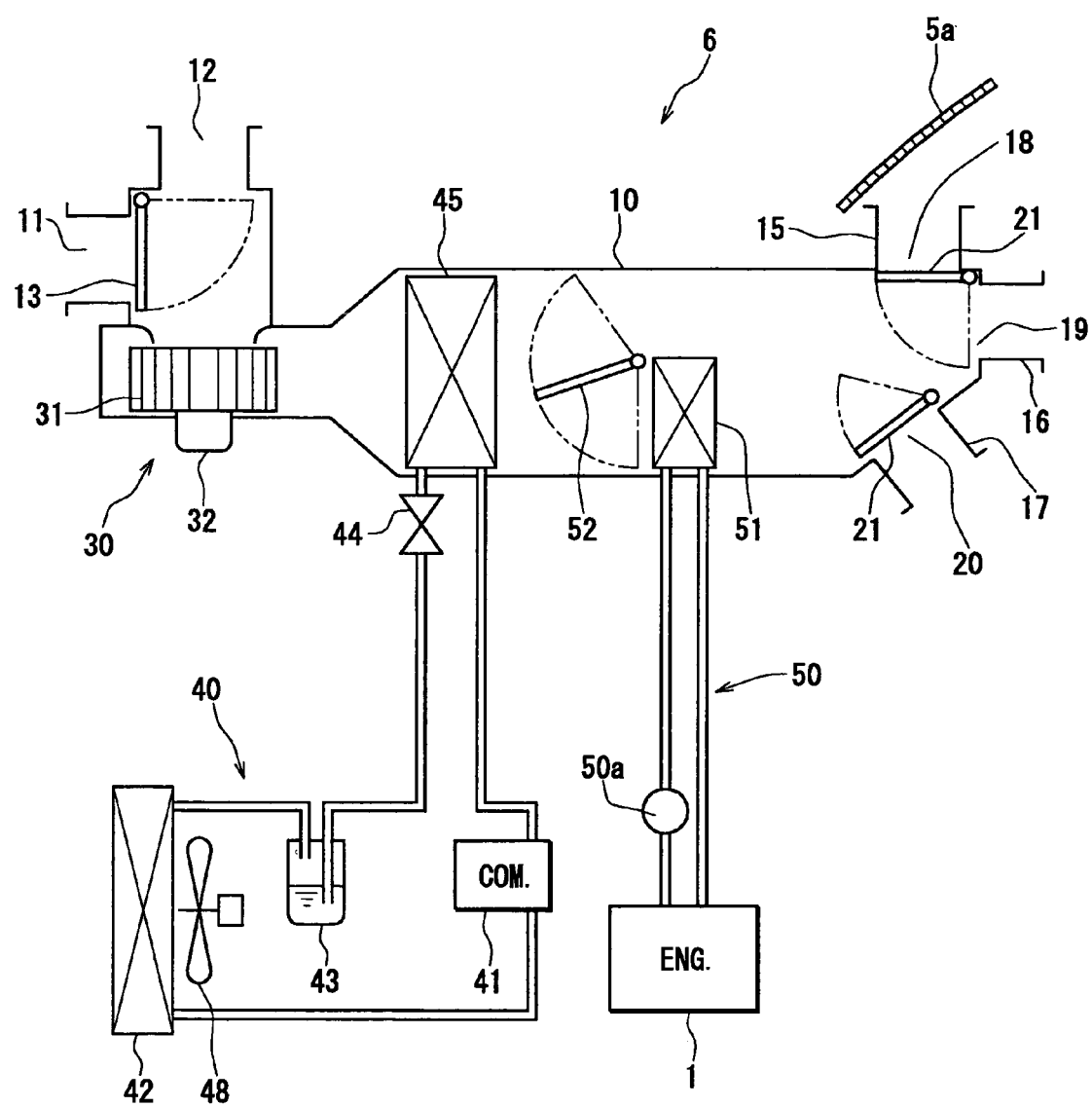
FIG. 1 is a schematic diagram showing an entire structure of a vehicle air conditioner according to a preferred embodiment of the present invention.

The air conditioning unit 6 shown in FIG. 1 is disposed in the passenger compartment at a front side. The air conditioning unit 6 includes an air conditioning duct 10 for forming an air passage through which air is introduced into the passenger compartment, a centrifugal type blower 30 for blowing air in the air conditioning duct 10, a refrigerant cycle system 40, a cooling water circuit 50 and the like. The refrigerant cycle system 40 is disposed to cool air flowing through the air conditioning duct 10.

An inside/outside air switching box is disposed at the most upstream air side of the air conditioning duct 10. The inside/outside air switching box includes an inside air suction port 11 from which air (inside air) inside the passenger compartment is introduced, and an outside air suction port 12 from which air (outside air) outside the passenger compartment is introduced. These suction ports 11, 12 are opened and closed by an inside/outside air switching damper 13, and the inside/outside air switching damper 13 is driven by an actuator such as a servomotor. The inside/outside air switching damper 13 are operated to switch between an inside air circulation mode and an outside air introduction mode, for example.

At a most downstream air side of the air conditioning duct 10, a defroster opening portion 18, a face opening portion 19 and a foot opening portion 20 are provided. A defroster duct 15 is connected to the defroster opening portion 18, and a defroster air outlet port, through which conditioned air is blown toward an inner surface of a vehicle windshield 5a, is provided at the most downstream air end of the defroster duct 15.

A face duct 16 is connected to the face opening portion 19, and a face air outlet port, through which conditioned air is blown toward the upper half body of a passenger, is provided at the most downstream air end of the face duct 16. A foot duct 17 is connected to the foot opening portion 20, and a foot air outlet port, through which conditioned air is blown to the foot portion of the passenger, is provided at the most downstream air end of the foot duct 17.

Two switching dampers 21 are rotatably provided at inner sides of the air outlet ports 18–20. The switching dampers 21 are disposed to switch one air outlet mode among a face mode, a bi-level mode, a foot mode, a foot/defroster mode and a defroster mode.

The blower 30 includes a centrifugal fan 31 rotatably disposed in a scroll case integrated with the air conditioning duct 10, and a blower motor 32 for driving the centrifugal fan 31. A blown air amount (rotation speed of the centrifugal fan 31) is controlled in accordance with a blower voltage applied to the blower motor 32 through a blower driving circuit 33.

The refrigerant cycle system 40 includes a compressor 41, a condenser 42, a gas-liquid separator 43, an expansion valve 44, an evaporator 45, refrigerant piping for connecting these, and the like. The compressor 41 is disposed to compress refrigerant and to discharge the compressed refrigerant. The condenser 42 is disposed to condense refrigerant by performing a heat exchange between compressed refrigerant and outside air. The gas-liquid separator 43 is disposed to separate the condensed refrigerant from the condenser 42 into gas refrigerant and liquid refrigerant, so that only the liquid refrigerant flows to a downstream refrigerant side. The expansion valve 44 decompresses and expands the liquid refrigerant from the gas-liquid separator 43, and the evaporator 45 is disposed to perform a heat exchange between the decompressed refrigerant from the expansion valve 44 and air passing through the air conditioning duct 10.

A heater core 51 is disposed in a cooling water circuit 50 in which engine-cooling water (hot water) of the engine 1 is circulated by a water pump 50a. The heater core 51 performs an heat exchange between the engine-cooling water and air so that air passing through the heater core 51 is heated. The heater core 51 is disposed in the air conditioning duct 10 at a downstream air side of the evaporator 45 so as to partly cross the air passage in the air conditioning duct 10. An air mixing damper 52, driven by an actuator such as a servomotor, is rotatably disposed at an upstream air side of the heater core 51. The air mixing damper 52 adjusts a ratio of an air amount passing through the heater core 51 and an air amount bypassing the heater core 51, so as to adjust a temperature of air to be blown into the passenger compartment.

Figure 2:
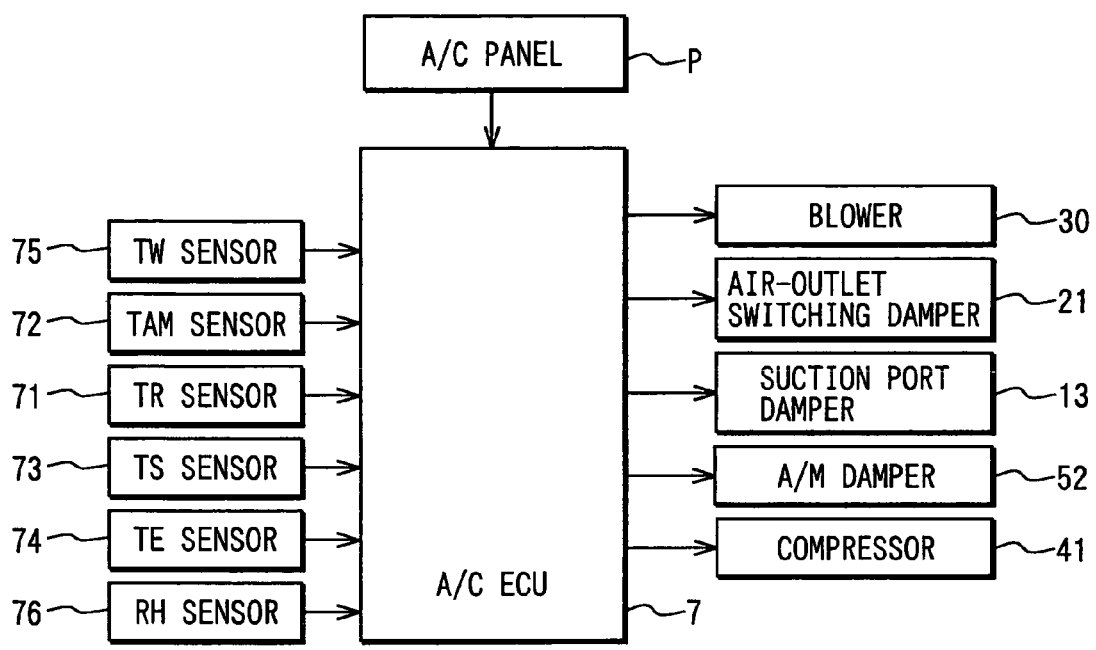
FIG. 2 is a block diagram showing a control system of the vehicle air conditioner according to the embodiment.

Next, a control system of the first embodiment will be described with reference to FIG. 2. As shown in FIG. 2, switch signals from plural switches provided on a control panel P on a front portion of the passenger compartment, and sensor signals from plural sensors are input to the air conditioning controller 7.

Specifically, the plural sensors include an inside air temperature sensor 71, an outside air temperature sensor 72, a solar radiation sensor 73, a post-evaporator temperature sensor 74 (temperature detecting means), a water temperature sensor 75 and a humidity sensor 76. The inside air temperature sensor 71 detects an air temperature TR in the passenger compartment, and the outside air temperature sensor 72 detects an air temperature TAM outside the passenger compartment. The solar radiation sensor 73 detects a solar radiation amount TS radiated into the passenger compartment. The post-evaporator temperature sensor 74 detects a temperature TE of air immediately after passing through the evaporator 45. The water temperature sensor 75 detects a temperature TW of cooling water flowing into the heater core 51, and the humidity sensor 76 detects a relative humidity RH of air flowing into the passenger compartment.

The post-evaporator temperature sensor 74 is disposed at a position immediately after the evaporator 45 to detect the air temperature (i.e., post-evaporator temperature) immediately after passing the evaporator 45. Generally, the post-evaporator temperature sensor 74 is constructed with a thermistor. The humidity sensor 76 is disposed within the passenger compartment around a lower side of an instrument panel of the vehicle, together with the inside air temperature sensor 71. The humidity sensor 76 generates a voltage in proportion to the relative humidity of the inside air of the passenger compartment.

In this embodiment, the inside air temperature sensor 71 and the humidity sensor 76 are arranged in a ventilation path through which air in the passenger compartment is ventilated, so as to detect a temperature TR and a humidity RH of air passing through the ventilation path. An aspirator is provided in the ventilation passage, so that air inside the passenger compartment is ventilated in the ventilation passage by a ventilation amount corresponding to an air flowing amount in the air conditioning duct 10.

The air conditioning controller 7 (A/C ECU) includes a microcomputer (not shown) composed of a central processing unit (CPU), a read only memory (ROM), a random access memory (RAM) and the like. Sensor signals from the sensors 71–76 are converted from analog signals to digital signals by an input circuit (not shown) within the air conditioning controller 7. Thereafter, the digital signals are inputted into the microcomputer.

The air conditioning controller 7 controls operation of components such as the blower 30, the air outlet switching damper 21, the inside/outside air switching damper (air suction port damper) 13, the air mixing damper 52 and the compressor 41, based on input signals from the sensors 71–76 and input signals from various switches, in accordance with a predetermined control process described later.

Figure 3:
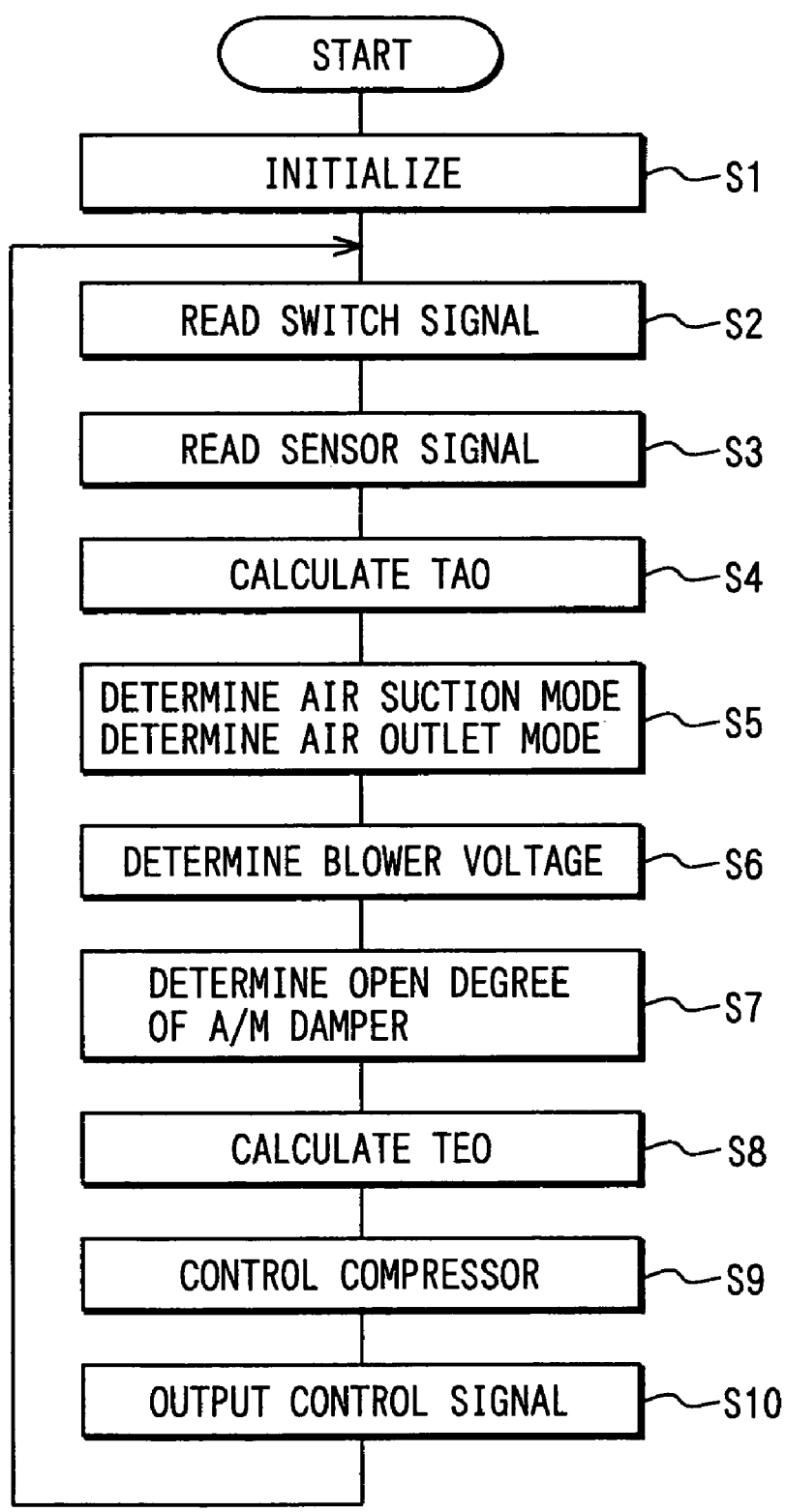
FIG. 3 is a flow diagram showing basic control processes of an air conditioning controller (A/C controller) shown in FIG. 1.
Figure 5:
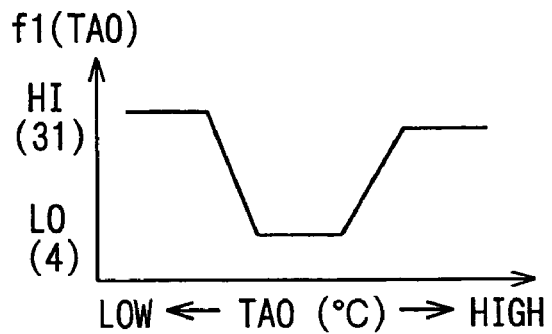
FIG. 5 is a characteristic graph showing a blower air amount f1 (TAO) corresponding to a target temperature TAO of air to be blown into a passenger compartment, according to the embodiment.
Figure 6:
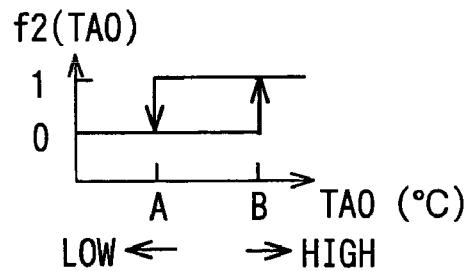
FIG. 6 is a characteristic graph showing a control value f2 (TAO) corresponding to the target blowing temperature TAO, according to the embodiment.
Figure 7:
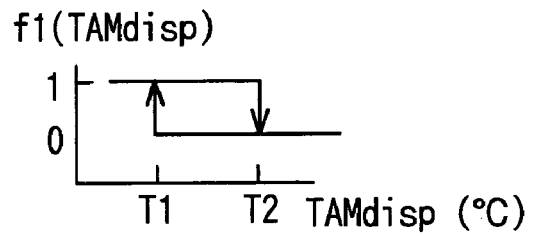
FIG. 7 is a characteristic graph showing a control value f1 (TAMdisp) corresponding to an outside-air temperature correction value TAMdisp, according to the embodiment.
Figure 8:
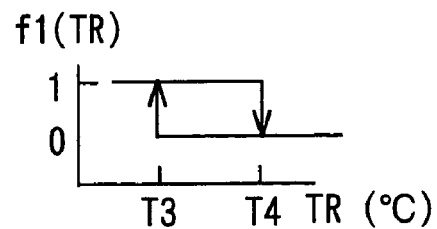
FIG. 8 is a characteristic graph showing a control value f1 (TR) corresponding to an inside air temperature TR, according to the embodiment.

Next, control processes of the air conditioning controller 7 will be described with reference to FIGS. 5 and 6. When the ignition switch is turned on, a direct-current electrical power is applied to the air conditioning controller 7, and a control routine shown in FIG. 3 is started. First, initial setting is performed at step S1. Next, at step S2, the air conditioning controller 7 reads the switch signals from the switches such as a temperature setting switch. At step S3, the air conditioning controller 7 reads the sensor signals, from the inside air temperature sensor 71, the outside air temperature sensor 72, the solar radiation sensor 73, the post-evaporator temperature sensor 74, the water temperature sensor 75 and the humidity sensor 76, after converted from analog signals to digital signals.

At step S4, a target temperature TAO of air to be blown into the passenger compartment is calculated based on the following formula (1) beforehand stored in the ROM.

$$TAO = KSET \times TSET - KR \times TR - KAM \times TAM - KS \times TS + C \quad (1)$$

wherein, TSET indicates a temperature set by the temperature setting switch, TR indicates an inside air temperature detected by the inside air temperature sensor 71, TAM indicates an outside air temperature detected by the outside air temperature sensor 72, and TS indicates a solar radiation amount detected by the solar radiation sensor 73. KSET, KR, KAM and KS indicate gain coefficients, respectively, and C indicates a correction constant.

Figure 9:
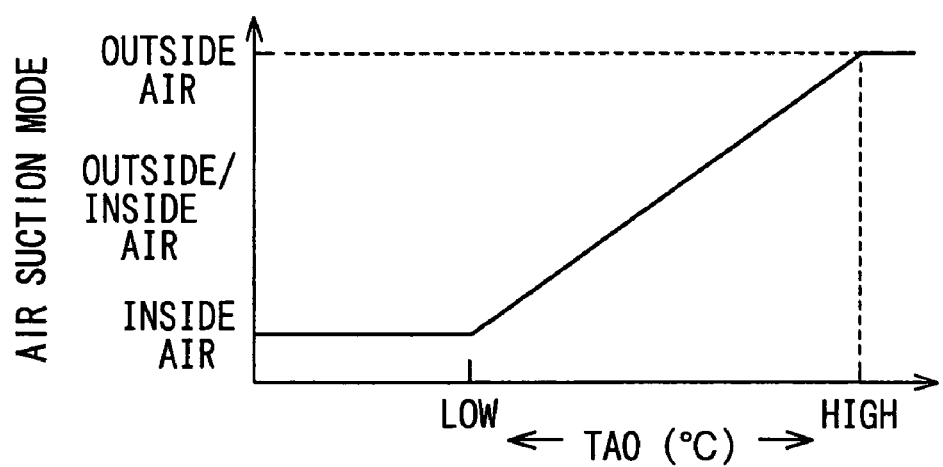
FIG. 9 is a characteristic graph showing an air suction mode corresponding to the target air temperature TAO, according to the embodiment.
Figure 10:
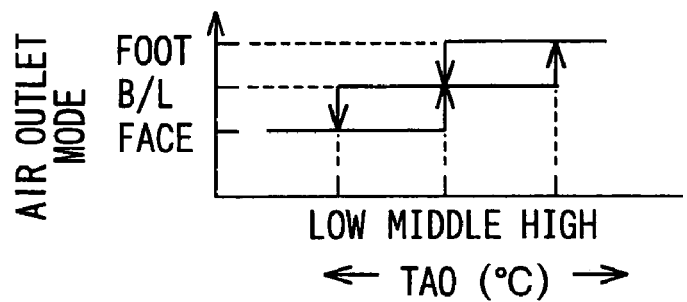
FIG. 10 is a characteristic graph showing an air outlet mode corresponding to the target air temperature TAO, according to the embodiment.

Next, at step S5, an air suction mode corresponding to the target air temperature TAO is determined using the characteristic graph in FIG. 9 beforehand stored in the ROM. Specifically, when the target air temperature TAO is low, an inside air circulation mode is selected. When the target air temperature TAO is high, an outside air introduction mode is selected. Further, when the target air temperature TAO is a middle temperature, an inside/outside air mixing mode is selected. Further, at step S5, an air outlet mode corresponding to the target air temperature TAO is determined using the characteristic graph shown in FIG. 10 beforehand stored in the ROM. Specifically, when the target air temperature TAO is low, the foot mode is selected. As the target air temperature TAO becomes higher, the air outlet mode is selected from the foot mode to the face mode through the bi-level mode. When the air suction mode or the air outlet mode is manually set by a switching operation on the control panel P, the manually selected mode is determined as a set mode.

Figure 4:
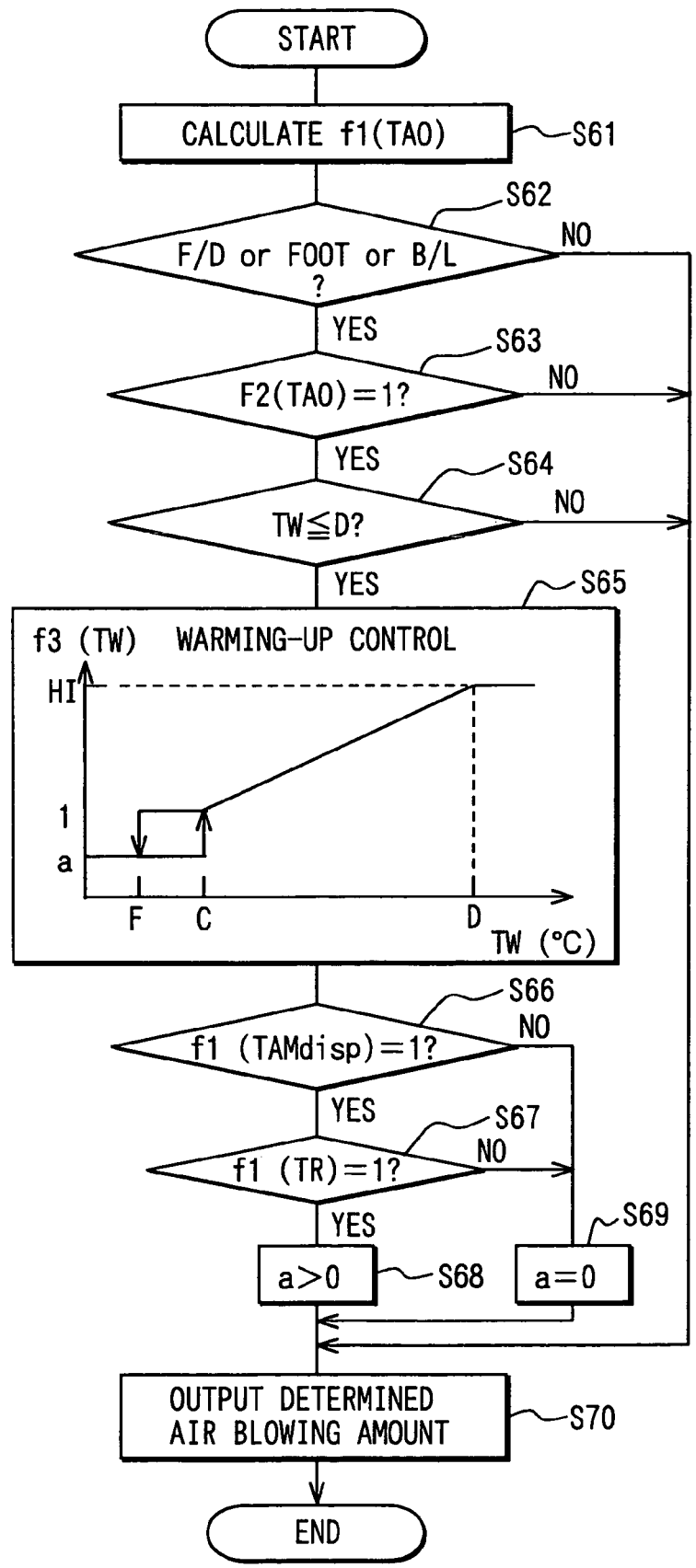
FIG. 4 is a flow diagram showing a detail control at step S6 in FIG. 3, according to the embodiment.

Next, at step S6, a blower voltage applied to a blower motor 32 of the blower 30 is determined based on the control program shown in FIG. 4. When an automatic air-blowing amount control is performed, the control process in FIG. 4 is performed. When the air blowing amount is manually set on the control panel P, the manually set air amount is determined as the set air-blowing amount.

FIG. 4 shows detail control process of step S6 in FIG. 3. First, at step S61, a blower amount f1(TAO) is calculated based on the target air temperature TAO calculated at step S4 in accordance with the characteristics shown in FIG. 5. For example, when the target air temperature TAO is high or low, the blower amount f1(TAO) is set at a high value (e.g., 31). In contrast, when the target air temperature TAO is a middle-level temperature, the blower amount f(TAO) is set at a low value (e.g., 4).

Next, at steps S62–S64, it is determined whether or not a warming-up control of the blower 30 is necessary. Specifically, at step S62, it is determined whether the air outlet mode is any one of the foot/defroster mode, the foot mode and the bi-level mode. When the air outlet mode is any one of the foot/defroster mode, the foot mode and the bi-level mode, it is determined whether or not a control value f2(TAO) is 1 based on the calculated target air temperature TAO in accordance with the characteristic graph shown in FIG. 6. That is, at step S63, it is determined whether or not a heating operation is set. When the control value f2(TAO) is 1, it is determined that the heating operation is set. In contrast, when the control value f2(TAO) is 0, it is determined that the cooling operation is set.

When the control value f2(TAO) is 1 and the heating operation is set at step S64, it is determined whether or not the cooling water temperature TW detected by the water temperature sensor 75 is equal to or lower than a predetermined temperature D at step S64.

When the cooling water temperature TW detected by the water temperature sensor 75 is equal to or lower than the predetermined temperature D at step S64, it is determined that the warming-up control of the blower 30 is necessary. In this case, at step S65, an air-amount control value f3(TW) is determined in accordance with the water temperature TW, and the warming-up control of the blower 30 is performed. Specifically, at step S65, when the water temperature TW flowing into the heater core 51 is lower than a predetermined temperature F, the blower air amount level is set at a value "a" that is 0 or a little air amount by the control operation of steps S66–S69. Until the water temperature TW becomes higher than a predetermined temperature C that is higher than the predetermined temperature F, the blower air amount level is set at the value "a". When the water temperature TW becomes higher than the predetermined temperature C, the control value f(TW) is increased in accordance with the increase of the water temperature TW.

At step S66, it is determined whether or not a control value f1(TAMdisp) corresponding to an outside-air temperature correction value TAMdisp is 1. When control value f1(TAMdisp) corresponding to an outside air temperature correction value TAMdisp is 1, it is determined whether or not a control value f1(TR) corresponding to an inside air temperature correction value TR is 1 at step S67. When both the determinations of steps S66 and S57 are YES, it is determined that the inside air temperature TR and the outside air temperature TAM are low and the windshield 5a of the vehicle is in an easy fogging condition. In this case, even when the water temperature TW is low, the defroster mode is set as the air outlet mode, and the air blowing amount is set at a small positive value "a" lower than 1, at step S68.

In contrast, when any one determination at step S66 or S67 is NO, the value "a" of the air blowing amount is set at 0 at step S69, until the water temperature TW is increased to the predetermined temperature C.

Next, at step S70, the blower air amount is finally set, and the control signal is output to the blower 30.

After the blower air amount is determined at step S70 of FIG. 4, step S7 in FIG. 3 is performed. Specifically, at step S7, a target open degree SW of the air mixing damper 52 is calculated in accordance with formula (2) based on the target air temperature TAO, the evaporator air temperature TE detected by the post-evaporator temperature sensor 74, the cooling water temperature TW detected by the water temperature sensor 75.

$$SW = [(TAO - TE)/(TW - TE)] \times 100(\%) \quad (2)$$

When SW ≤ 0(%), the air mixing door 52 is controlled to a maximum cooling position where all cool air from the evaporator 45 bypasses the heater core 51. When SW ≥ 100 (%), the air mixing door 52 is controlled to a maximum heating position where all cool air from the evaporator 45 passes through the heater core 51. Further, when 0(%) <SW<100(%), the air mixing door 52 is operated at a middle position where a part of cool air from the evaporator 45 flows into the heater core 51, and the other part of cool air from the evaporator 45 bypasses the heater core 51.

Figure 11:
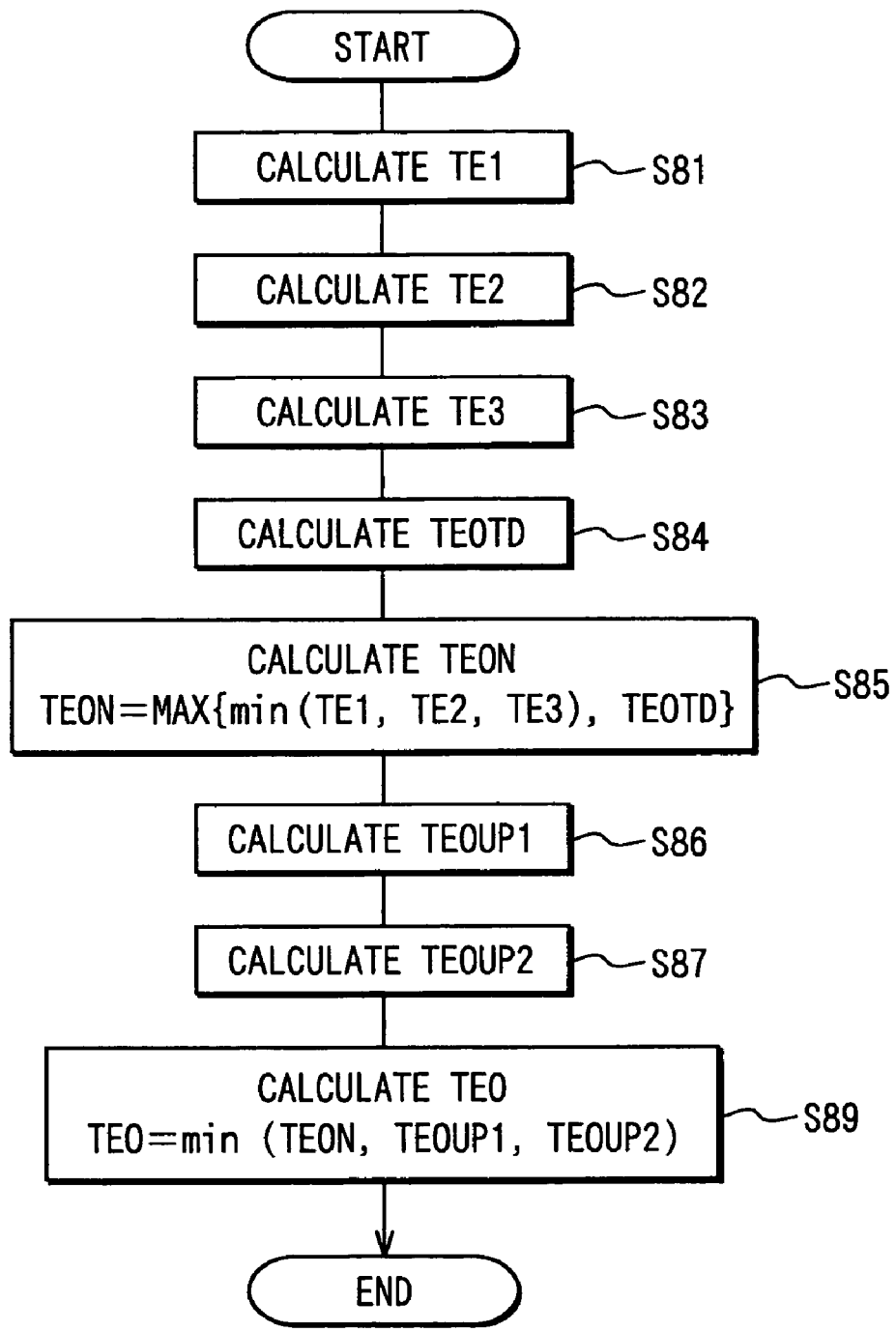
FIG. 11 is a flow diagram showing a detail control at step S8 in FIG. 3.

Next, at step S8, a target post-evaporator temperature TEO (target cooling temperature) of air blown from the evaporator 45 is calculated. FIG. 11 is a detail control of step S8 in FIG. 3. In FIG. 11, first, the target post-evaporator temperatures, which are necessary for performing various controls such as a temperature adjustment control, a comfortable humidity control and defogging control, are calculated.

The temperature adjustment control is a control operation for controlling the compressor 41 so that the detected post-evaporator air temperature TE becomes a target post-evaporator temperature TE1 corresponding to the target air temperature TAO. The comfortable humidity control is a control operation for controlling the compressor 41 so that the detected post-evaporator air temperature TE becomes a target post-evaporator temperature TE2 corresponding to the humidity in the passenger compartment. Therefore, in the comfortable humidity control, the compressor 41 is controlled so that the humidity of the passenger compartment is controlled in a value between an upper limit set value and a lower limit set value. In the defogging control, the compressor 41 is controlled so that the detected post-evaporator air temperature TE becomes a target post-evaporator temperature TE3 that is set based on a limit humidity of the passenger compartment relative to the outside air temperature TAM. A fogging of the windshield 5a is generated in accordance with a glass surface temperature Tg and a dew point temperature Td of air contacting the windshield 5a. That is, when Tg<Td, the windshield 5a is fogged.

Figure 12:
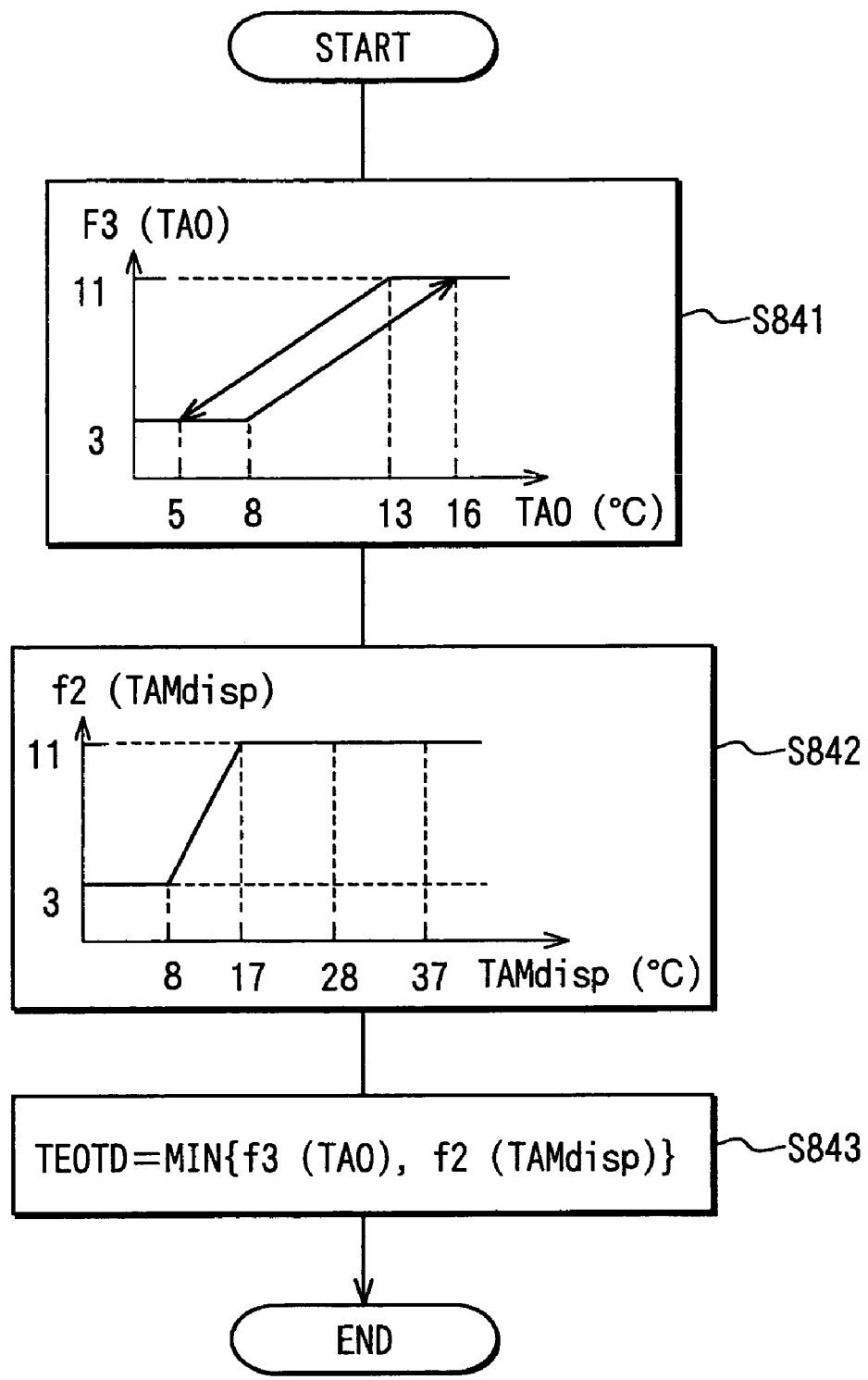
FIG. 12 is a flow diagram showing a detail control at step S84 in FIG. 11.

As shown in FIG. 11, at step S81, S82, S83, the TE1, the TE2 and the TE3 are calculated. Then, at step S84, a target post-evaporator temperature TEOTD for defogging the windshield 5a is calculated based on the control process shown in FIG. 12. Specifically, at step S841, a target post-evaporator temperature f3 (TAO) is determined based on the target air temperature TAO in accordance with the characteristic graph at step S841 in FIG. 12. Then, at step S842, a target post-evaporator temperature f2 (TAMdisp) is determined based on the outside-air temperature correction value TAMdisp in accordance with the characteristic graph at step S842 in FIG. 2. Next, at step S843, a smaller one between the calculated target post-evaporator temperature f3 (TAO) and the calculated target post-evaporator temperature f2 (TAMdisp) is determined as the target post-evaporator temperature TEOTD.

After the target post-evaporator temperature TEOTD is calculated at step S84 in FIG. 11, a minimum value of the target post-evaporator temperatures TE1, TE2 and TE3 at steps S81–S83 is calculated, and a larger one between the target post-evaporator temperature TEOTD and the minimum value of the target post-evaporator temperatures TE1, TE2 and TE3 is determined as the target post-evaporator temperature TEON at step S85. The target post-evaporator temperature TEON calculated at step S85 is a suitable control value for suitably performing all the temperature adjustment control, the comfortable humidity control and the defogging control while being not lower than the target post-evaporator temperature TEOTD. Accordingly, all the temperature adjustment control, the comfortable humidity control and the defogging control can be suitably performed while the consumed power in the compressor 41 can be effectively reduced.

Figure 13:
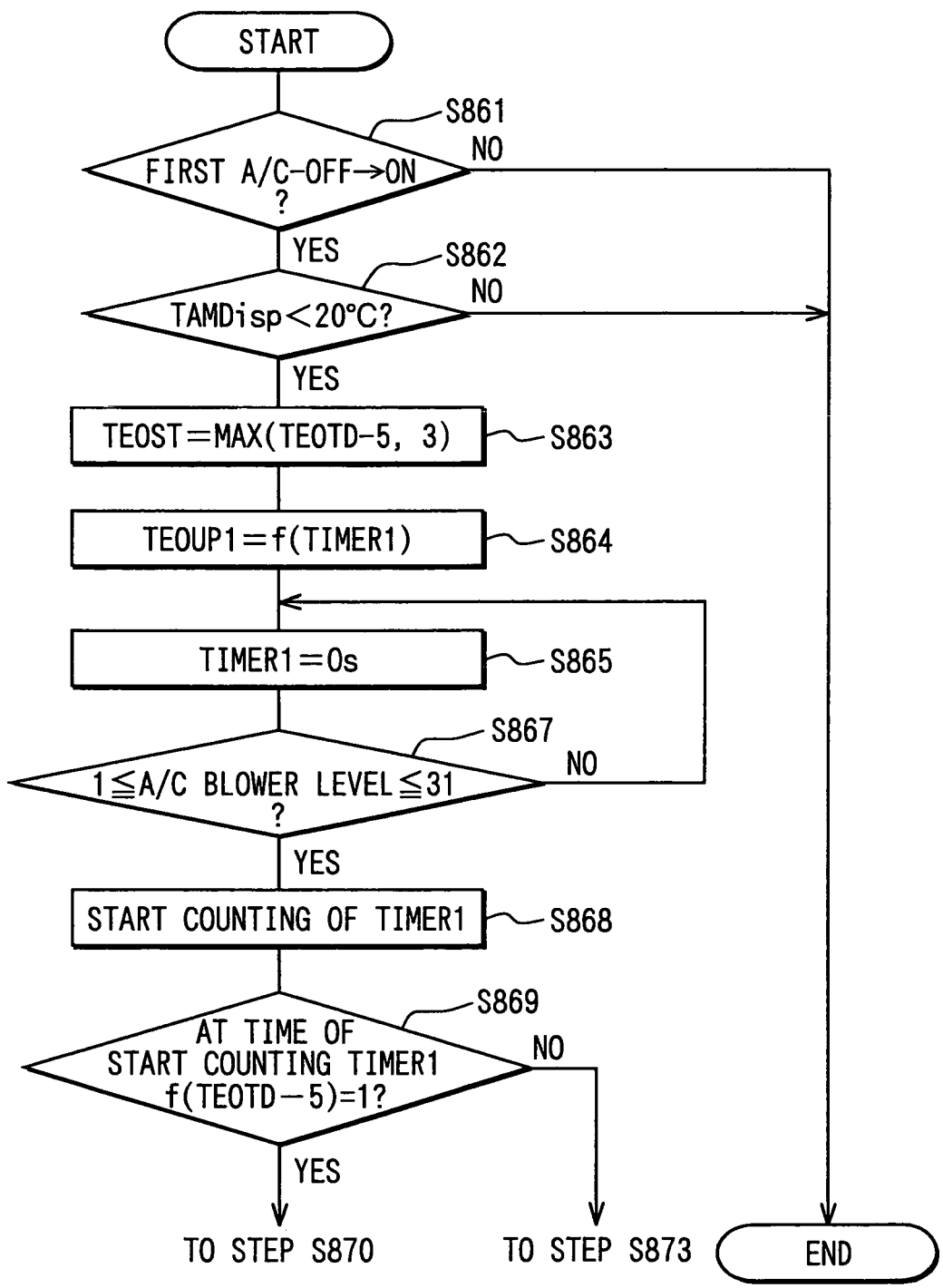
FIG. 13 is a flow diagram showing a part of the control at step S86 in FIG. 11.
Figure 14:
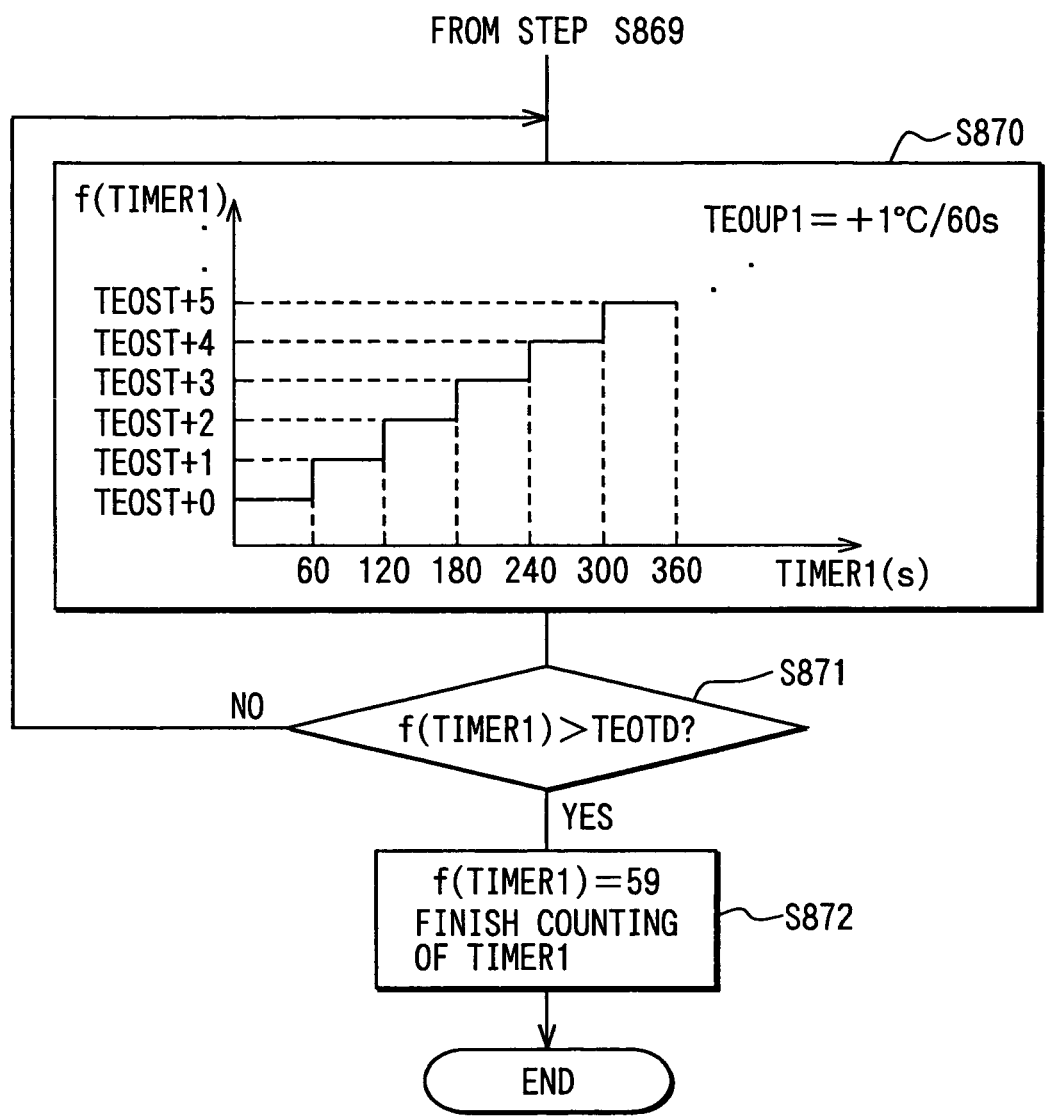
FIG. 14 is a flow diagram showing a part of the control at step S86 in FIG. 11.
Figure 15:
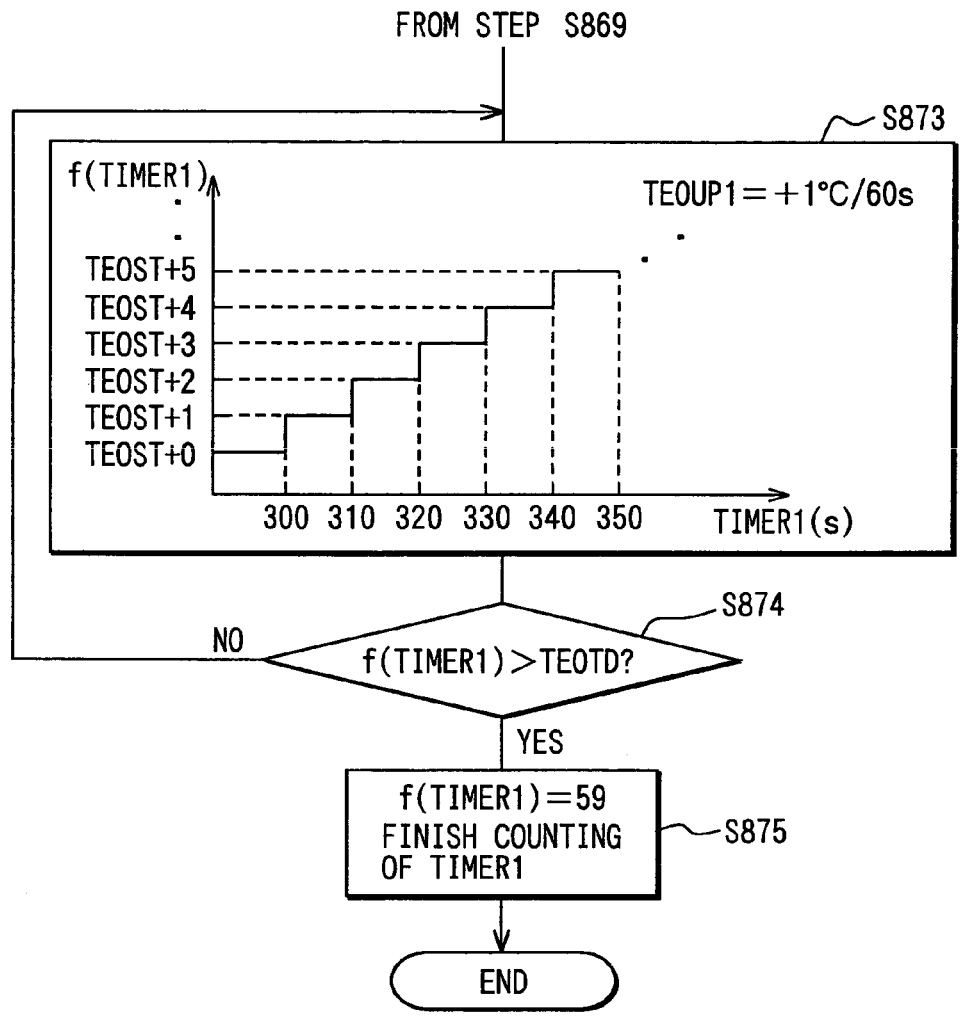
FIG. 15 is a flow diagram showing a part of the control at step S86 in FIG. 11.

After performing step S85 in FIG. 11, a target post-evaporator temperature TEOUP1 (second temperature) is calculated at step S86 of FIG. 11 in accordance with the flow diagrams in FIGS. 13–15.

When an ignition switch of the vehicle is turned ON from an OFF state, a target post-evaporator temperature TEOST is set at an impossible value (e.g., TEOST=59) at which a dehumidifying operation is impossible to be performed. After the ignition switch is turned ON, the first turning-ON of the air conditioning operation is watched and is detected at step S861. When the first turning-ON of the air conditioning operation after the ignition switch is turned ON is determined, it is determined whether or not the outside-air temperature correction value TAMdisp is in an easy fogging condition (e.g., TAMdisp<20° C.) of the windshield 5a at step S862. In the easy fogging condition (e.g., TAMdisp<20° C.), the windshield 5a is readily fogged.

When TAMdisp<20 C., the control program processes to step S863. In contrast, when the determination at step S861 or S862 is NO, the control program of FIG. 13 is ended.

Next, at step S863, the target post-evaporator temperature TEOST is set at a larger one between (TEOTD−N° C.) and a frost-preventing temperature. Here, (TEOTD−N° C.) is a temperature lower than the TEOTD for performing defrosting of the windshield 5a. For example, (TEOTD−N° C.) is (TEOTD−5° C.) at step S863. Further, when the frost-preventing temperature of the evaporator 45 is 3° C. or about 3° C., the dehumidifying capacity becomes maximum while the evaporator 45 is prevented from being frosted. Accordingly, at step S863, the target post-evaporator temperature TEOST is set at a larger one between (TEOTD−5° C.) and 3° C., for example.

Next, at step S864, the target post-evaporator temperature TEOUP1 is set at f(TIMER1) corresponding to a timer time TIMER1. Here, the timer time TIMER1 is a relation value relating to the temperature of water flowing into the heater core 51. Then, at step S865, the counting of the timer time TIMER1 is reset at zero (0s). Next, at step S867, it is determined whether or not the blower level is in a range between 1–31. When the blower level is in the range between 1–31, the counting of timer time TIMER1 is started at step S868. When the blower level is not in the range between 1–31 at step S867, the timer time TIMER1 is not counted and the control program returns to step S865. That is, when the air amount level is the value "a" that is lower than 1 at step S65, the timer time TIMER1 is not counted.

Figure 16:
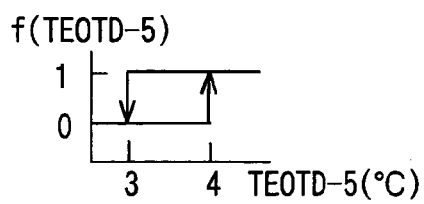
FIG. 16 is a characteristic graph showing a control value f(TEOTD−5) corresponding to a target post-evaporator temperature (TEOTD−5° C.), according to the embodiment.

After step S868, it is determined whether or not a value f (TEOTD−5) corresponding to (TEOTD−5° C.) is 1. The value f (TEOTD−5) is determined based on the graph of FIG. 16. When f (TEOTD−5)=1, the control process moves to step S870 of FIG. 14. That is, when f (TEOTD−5)=1, it is determined that the target post-evaporator temperature TEOTD is relatively high. In contrast, when f (TEOTD−5) =0, the control process moves to step S873 of FIG. 15. That is, when f (TEOTD−5)=0, it is determined that the target post-evaporator temperature TEOTD is relatively low.

When the control process moves to step S870, the value f(TIMER1) is increased by 1° C. every 60 seconds from the TEOST. After the control at step S870 is performed, the f(TIMER1) is compared with TEOTD at every elapsed time of 60 seconds in the timer time TIMER1 at step S871. When f(TIMER1)>TEOTD at step S871, the control at step S870 is stopped, f(TIMER1) is set at 59 and the counting of timer time TIMER1 is finished at step S872.

When the control program moves to step S873 in FIG. 15, the TEOST is maintained for 300 seconds, and thereafter, the value f(TIMER1) is increased from the TEOST by 1° C. every 10 seconds. After the counting of the timer time TIMER1 passes 350 seconds, the value f(TIMER1) is increased by 1° C. every 60 seconds. Then, at step S874, the f(TIMER1) is compared with the TEOTD at every elapsed time of 10 seconds after the timer time TIMER1 passes 300 seconds at step S874. When f(TIMER1)>TEOTD at step S874, the control at step S873 is stopped, f(TIMER1) is set at 59 and the counting of timer time TIMER1 is finished at step S875.

Figure 17:
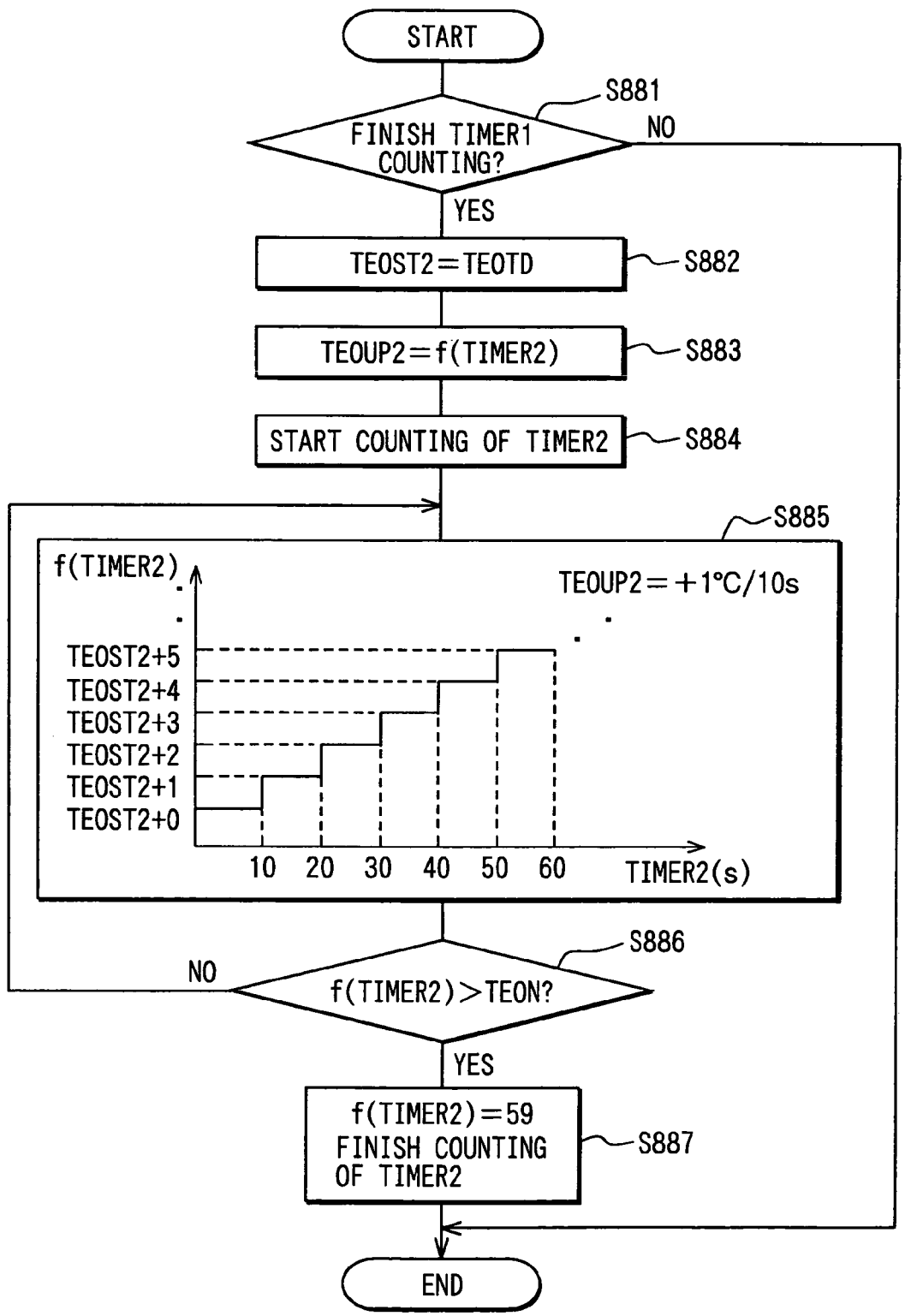
FIG. 17 is a flow diagram showing a detail control at step S88 in FIG. 11.

After step S86 in FIG. 11 is performed, a target post-evaporator temperature TEOUP2 is calculated at step S88 in accordance with the flow diagram in FIG. 17. FIG. 17 is a detail control at step S88 in FIG. 11.

When the ignition switch of the vehicle is turned ON from an off state, a target post-evaporator temperature TEOST2 is set at a value at which a dehumidifying capacity cannot be obtained. For example, in this case, the target post-evaporator temperature TEOST2 is set at 59 (TEOST2=59). Further, in the counting of the timer time TIMER1, the target post-evaporator temperature TEOST2 is maintained at 59 (TEOST2= 59). Then, at step S881, it is determined whether or not a counting of the timer time TIMER1 is finished. When the counting of the timer time TIMER1 is finished at step S881, the target post-evaporator temperature TEOST2 is set at the TEOTD (TEOST2=TEOTD) at step S882.

Next, the target post-evaporator temperature TEOUP2 is set at a value f(TIMER2) corresponding to a timer time TIMER2 at step S883, and counting of the timer time TIMER2 starts at step S884. Then, the control program moves to step S885.

When the control process moves to step S885, the value f(TIMER2) is increased from the TEOST2 by 1° C. every 10 seconds. After the control at step S885 is performed, the f(TIMER2) is compared with the TEON that is calculated at step S85. When f(TIMER2)>TEON, the control at step S885 is stopped, f(TIMER2) is set at 59 and the counting of the timer time TIMER2 is finished at step S887.

After steps S85, S86 and S88 in FIG. 11 are performed, a minimum value among the calculated TEON, THOUP1 and TEOUP2 is finally set as the target post-evaporator temperature TEO. After the air conditioning controller 7 calculates the post-evaporator temperature TEO, the air conditioning controller 7 returns to the main control routine in FIG. 3, and the operation of the compressor 41 is controlled so that the detected temperature TE of the post-evaporator temperature sensor 74 approaches the finally determined target post-evaporator temperature TEO.

Next, at step S10 in FIG. 3, control signals are output so that control states calculated and determined at steps S5, S6, S7 and S9 can be set. Then, the control program returns to step S2.

According to the present invention, the air conditioning controller 7 calculates the target post-evaporator temperature TEON (i.e., first temperature of the present invention) that is set at step S85 in FIG. 11 based on the detected humidity of the humidity sensor 76 to be able to defog the windshield 5a. Further, the air conditioning controller 7 calculates the target post-evaporator temperatures TEOUP1, TEOUP2 (i.e., second temperature) that are set to defog the windshield 5a at steps S86 and S88 in FIG. 11 regardless of the detection humidity of the humidity sensor 76 at a time immediately after the start of the warming-up control of the blower 30 when the outside air temperature is low. Then, the air conditioning controller 7 compares the target post-evaporator temperatures TEON, TEOUP1 and TEOUP2 at step S89, and the minimum value among the target post-evaporator temperatures TEON, TEOUP1 and TEOUP2 is finally set as the target post-evaporator temperature TEO (target cooling temperature) of the evaporator 45.

Accordingly, even when the blower 30 blows air by a low air-blowing level in the warming-up control and the humidity sensor 76 detects a humidity lower than an actual humidity inside the passenger compartment, because the target post-evaporator temperatures TEOUP1, TEPUP2 regardless of the detected humidity are used, the dehumidifying of the windshield 5a can be accurately performed.

Further, the target post-evaporator temperatures TEOUP1, TEPUP2 are set to be gradually increased in accordance with the timer time relating to the water temperature TW (cooling water temperature of the engine). In this case, the target post-evaporator temperatures TEOUP1, TEPUP2 gradually approaches the target post-evaporator temperature TEON. Generally, after the fogging of the windshield 5a is removed at a time immediately after the start of the blower 30, it is unnecessary to increase the dehumidifying capacity. As a result, it can prevent the compressor 41 from being driven by a capacity more than a necessary capacity, thereby preventing the consumption power of the compressor 41 from being increased.

In this embodiment, the target post-evaporator temperature TEOUP1 is increased from the TEOST that is determined in a temperature range without causing a frost of the evaporator 45. Therefore, the defogging of the windshield 5a can be performed while the evaporator 45 is prevented from being frosted.

Further, when the TEOST becomes higher than a suitable temperature of the defogging in order to prevent a frost of the evaporator 45, the target post-evaporator temperature TEOUP1 is maintained at the TEOST (e.g., frost-preventing temperature) for a predetermined time (e.g., 300s), and thereafter, the TEOST is increased. Accordingly, fogging of the windshield 5a can be accurately prevented.

In addition, in a case where it is determined that the windshield 5a is readily fogged based on at least one of the outside air temperature and the inside air temperature, it is possible to blow air into the passenger compartment by a small air blowing amount. Thus, even in a time immediately after the start of the warming-up control, fogging of the windshield 5a can be rapidly removed.

Although the present invention has been fully described in connection with preferred embodiment thereof with reference to the accompanying drawings, it is to be noted that various changes and modifications will become apparent to those skilled in the art.

For example, in the above-described embodiment of the present invention, in a case where the windshield 5a is readily fogged when the air blowing amount of the blower 30 is low, the target post-evaporator temperatures TEOUP1, TEPUP2 without depending on the detected humidity of the humidity sensor 76 are used, so that defogging performance can be improved. However, in this case, the target post-evaporator temperature TEO can be calculated by a set humidity higher than the detection humidity of the humidity sensor 76. Specifically, when the air flow amount (i.e., air blowing amount of the blower 30) in the air conditioning duct 10 is equal to or larger than a predetermined amount, the air conditioning controller 7 calculates the target temperature TEO of air to be cooled by the evaporator 45, for defogging the windshield 5a of the vehicle, based on the humidity detected by the humidity detection sensor 74. In contrast, when the air flow amount in the air conditioning duct 10 is lower than the predetermined amount, the air conditioning controller 7 calculates the target temperature TEO for defogging the windshield 5a based on a set humidity higher than the humidity detected by the humidity detection sensor 74. Accordingly, the windshield 5a can be always sufficiently defogged.

For example, in a case where the air blowing amount of the blower 30 is lower than a predetermined amount, when the target post-evaporator temperature TE3 is calculated at step S83, the target post-evaporator temperature can be calculated by using a high humidity (e.g., 100%) without being depended on the detected humidity of the humidity sensor 76. Alternatively, the target post-evaporator temperature can be calculated by using a set humidity that is obtained by adding a predetermined value in the detection humidity of the humidity sensor 76. Accordingly, at step S85, a target post-evaporator temperature for accurately performing the defogging of the windshield 5a can be calculated by using the set humidity.

Further, in the above-described embodiment, the windshield 5a can be accurately defogged by using the TEON as the final target post-evaporator temperature, without performing steps S86, S88 and S89 in FIG. 11.

In the above-described embodiment, the target post-evaporator temperatures TEOUP1, TEPUP2 are gradually increased with the timer time that is a relating value of the water temperature TW. However, the target post-evaporator temperatures TEOUP1, TEPUP2 can be gradually increased with the air blowing amount of the blower 30, which is also a relating value of the water temperature TW.

In the above-described embodiment, the easy fogging condition of the windshield 5a is determined by using the outside-air temperature correction value TAMdisp that is a correction value of the detected outside air temperature TAM. However, the easy fogging condition of the windshield 5a can be determined directly by using the detected outside air temperature TAM, and the other calculation using the outside-air temperature correction value TAMdisp can be performed by directly using the detected outside air temperature TAM.

In the above-described embodiment, the heater core 51 heats air passing therethrough by using engine-cooling water as a heating source. However, the heating core 51 can heat air passing therethrough by using a cooling water for cooling a heat-generating member of the vehicle as a heating source.

Such changes and modifications are to be understood as being within the scope of the present invention as defined by the appended claims.

What is claimed is:

1. An air conditioner for a vehicle having a compartment, the air conditioner comprising:
   an air conditioning duct through which air flows into the compartment;
   a cooling heat exchanger, disposed in the air conditioning duct, for cooling and dehumidifying air in the air conditioning duct in accordance with operation of a compressor;
   a temperature detection unit which detects a temperature of air cooled in the cooling heat exchanger;
   a humidity detection unit which detects a humidity of air passing a ventilation passage through which air inside the compartment is ventilated in accordance with an air flow amount in the air conditioning duct; and
   a controller which controls the compressor so that the temperature detected by the temperature detection unit approaches a target cooling temperature, wherein:
   when the air flow amount in the air conditioning duct is equal to or larger than a predetermined amount, the controller calculates the target cooling temperature of air to be cooled by the cooling heat exchanger, for defogging a windshield of the vehicle, based on the humidity detected by the humidity detection unit; and
   when the air flow amount in the air conditioning duct is lower than the predetermined amount, the controller calculates the target cooling temperature for defogging the windshield based on a set humidity higher than the humidity detected by the humidity detection unit.

2. The air conditioner according to claim 1, wherein the set humidity is a predetermined constant humidity.

3. The air conditioner according to claim 1, wherein the set humidity is higher than the detected humidity of the humidity detection unit by a predetermined value.

4. The air conditioner according to claim 1, further comprising:
   a heating heat exchanger disposed in the air conditioning duct for heating air after passing the cooling heat exchanger by using a cooling water for cooling a heat-generating member of the vehicle as a heating source; and
   a blower, disposed in the air conditioning duct, for blowing air into the compartment, wherein:
   the control unit controls an air blowing amount of the blower at a general amount corresponding to one of a temperature of the cooling water flowing into the heating heat exchanger and a relation value relating to the temperature of the cooling water when the one of the temperature of the cooling water and the relation value relating the temperature of the cooling water is in a range between a first value and a second value higher than the first value;
   the control unit determines a fogging generation condition of the windshield when the one of the temperature of the cooling water and the relation value relating to the temperature of the cooling water is lower than the first value; and
   in the fogging generation condition, the control unit controls the air blowing amount of the blower to be lower than the general amount.

5. The air conditioner according to claim 4, wherein the control unit determines the fogging generation condition based on at least one of an air temperature inside the compartment and an air temperature outside the compartment.

6. An air conditioner for a vehicle having a compartment, the air conditioner comprising:
   an air conditioning duct through which air flows into the compartment;
   a cooling heat exchanger, disposed in the air conditioning duct, for cooling and dehumidifying air in the air conditioning duct in accordance with operation of a compressor;
   a temperature detection unit which detects a temperature of air cooled in the cooling heat exchanger;
   a humidity detection unit which detects a humidity of air passing a ventilation passage through which air inside the compartment is ventilated in accordance with an air flow amount in the air conditioning duct; and
   a controller which controls the compressor such that the temperature detected by the temperature detecting unit becomes a target cooling temperature, wherein:
   the controller calculates a first temperature for performing a defogging of a windshield of the vehicle based on the humidity detected by the humidity detection unit, and calculates a second temperature for performing the defogging of the windshield regardless of the humidity detected by the humidity detection unit; and
   the controller determines a lower one between the first temperature and the second temperature, as the target cooling temperature.

7. The air conditioner according to claim 6, wherein:
   the controller compares a comparison temperature that is lower by a predetermined temperature than a defogging temperature of air cooled by the cooling heat exchanger for defogging the windshield, with a frost-preventing temperature of air cooled by the cooling heat exchanger, which is set to prevent a frost of the cooling heat exchanger; and the controller determines a higher one between the frost-preventing temperature and the comparison temperature, as the second temperature.

8. The air conditioner according to claim 7, further comprising a heating heat exchanger disposed in the air conditioning duct for heating air after passing the cooling heat exchanger by using a cooling water for cooling a heat-generating member as a heating source, wherein the controller increases the second temperature in accordance with an increase of a temperature of the cooling water or a relation value relating to the temperature of the cooling water.

9. The air conditioner according to claim 8, wherein the controller increases the second temperature such that an increase rate of the second temperature relative to an increase of the temperature of the cooling water or the relation value relating to the temperature of the cooling water is maintained at a set rate or becomes larger.

10. The air conditioner according to claim 9, wherein:

the controller determines whether the comparison temperature is lower than the frost-preventing temperature;

when the comparison temperature is lower than the frost-preventing temperature, the controller maintains the second temperature at the frost-preventing temperature for a predetermined time, and thereafter increases the second temperature in accordance with the increase of the temperature of the cooling water or the relation value.

11. An air conditioner for a vehicle having a compartment, the air conditioner comprising:

an air conditioning duct through which air flows into the compartment;

a cooling heat exchanger, disposed in the air conditioning duct, for cooling and dehumidifying air in the air conditioning duct in accordance with operation of a compressor;

a temperature detection unit which detects a temperature of air cooled in the cooling heat exchanger;

a humidity detection unit which detects an air humidity relating to a humidity of the compartment; and a controller which controls the compressor such that the temperature detected by the temperature detecting unit becomes a target cooling temperature, wherein:

the controller calculates a first temperature for performing a defogging of a windshield of the vehicle based on the humidity detected by the humidity detection unit, and calculates a second temperature for performing the defogging of the windshield regardless of the humidity detected by the humidity detection unit; and the controller determines a lower one between the first temperature and the second temperature, as the target cooling temperature.

* * * * *